(12) United States Patent
Perez Ramirez et al.

(10) Patent No.: US 12,404,925 B2
(45) Date of Patent: Sep. 2, 2025

(54) PULLEY ARRANGEMENT FOR A BELT DRIVE AND AGRICULTURAL MACHINE WITH SUCH

(71) Applicant: DEERE & COMPANY, Moline, IL (US)

(72) Inventors: Javier J. Perez Ramirez, Pinto (ES); Daniel Vergara Martinez, Torrejon de Ardoz (ES)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/737,145

(22) Filed: Jun. 7, 2024

(65) Prior Publication Data

US 2025/0020200 A1    Jan. 16, 2025

(30) Foreign Application Priority Data

Jul. 13, 2023  (EP) .................................. 23185394

(51) Int. Cl.
  *F16H 57/04*   (2010.01)
  *A01D 69/06*   (2006.01)
  *F16H 55/36*   (2006.01)

(52) U.S. Cl.
  CPC ......... *F16H 57/0416* (2013.01); *A01D 69/06* (2013.01); *F16H 55/36* (2013.01)

(58) Field of Classification Search
  CPC .... F16H 57/0416; F16H 55/36; F16H 55/171; F16H 7/023; F16H 7/02; A01D 69/06
  USPC ........................................................ 474/93
  See application file for complete search history.

(56) References Cited

U.S. PATENT DOCUMENTS

| | | | | |
|---|---|---|---|---|
| 427,244 A | * | 5/1890 | Stone | F16D 1/06 403/259 |
| 980,744 A | * | 1/1911 | Bentley | F16H 57/0415 474/93 |
| 1,358,205 A | * | 11/1920 | Heydon | B60L 5/06 474/93 |
| 1,392,915 A | * | 10/1921 | Clendenon | F16D 1/096 403/359.5 |
| 2,041,555 A | * | 5/1936 | Lee | F16F 15/124 403/357 |

(Continued)

FOREIGN PATENT DOCUMENTS

| | | |
|---|---|---|
| CN | 212839265 U | 3/2021 |
| EP | 3415407 A1 | 12/2018 |
| WO | WO 2016105457 A2 | 6/2016 |

OTHER PUBLICATIONS

Extended European Search Report and Written Opinion issued in European Patent Application No. 23185394.6 dated Jan. 23, 2024, in 06 pages.

*Primary Examiner* — Henry Y Liu (57) ABSTRACT

A pulley arrangement for a belt drive including an input shaft having first end and second end. The first end of the input shaft is couplable to a gear box. Further, the pulley arrangement includes a pulley mounted coaxially on the input shaft having an inner pulley surface and an outer pulley surface. The pulley arrangement further includes at least one ring disc. The at least one ring disc is fastened coaxially to the inner pulley surface or the outer pulley surface. A plurality of air flow directing protrusions, grooves, or both protrusions and grooves extend from an inner diameter to an outer diameter of the ring disc, and a circumferential ring disc gap is provided between the at least one ring disc and the input shaft.

20 Claims, 7 Drawing Sheets

(56) References Cited

U.S. PATENT DOCUMENTS

| | | | | | |
|---|---|---|---|---|---|
| 2,331,498 | A | * | 10/1943 | Otto | F16H 55/36 403/247 |
| 2,569,144 | A | * | 9/1951 | Benson | F16D 7/028 464/44 |
| 2,827,225 | A | * | 3/1958 | Killian | F16H 55/44 474/93 |
| 2,842,974 | A | * | 7/1958 | Neumann | F16H 55/44 474/93 |
| 2,850,852 | A | * | 9/1958 | Hofberger | F16H 55/36 474/93 |
| 2,955,748 | A | * | 10/1960 | Killian | B21D 53/261 474/93 |
| 3,119,140 | A | * | 1/1964 | Sallet | F16H 7/02 34/115 |
| 3,494,213 | A | * | 2/1970 | Schoenfeld | B27B 17/08 474/93 |
| 3,618,412 | A | * | 11/1971 | Schmid | F16H 55/56 474/93 |
| 3,659,471 | A | * | 5/1972 | Marsch | F16H 55/36 123/41.11 |
| 3,788,155 | A | * | 1/1974 | Cigala | F16H 55/48 474/190 |
| 3,826,306 | A | * | 7/1974 | Marsh | F16H 57/0412 165/47 |
| 3,943,785 | A | * | 3/1976 | Percifield | A01D 34/6806 474/93 |
| 4,144,755 | A | * | 3/1979 | Palloch | F16H 55/36 474/903 |
| 4,493,677 | A | * | 1/1985 | Ikenoya | F02B 61/02 474/93 |
| 4,509,933 | A | * | 4/1985 | Miranti, Jr. | F16H 55/49 474/93 |
| 4,525,150 | A | * | 6/1985 | Quick | F16H 57/05 474/166 |
| 4,530,680 | A | * | 7/1985 | Miranti, Jr. | F16H 57/0415 474/93 |
| 4,531,928 | A | * | 7/1985 | Ikenoya | F02B 61/02 474/146 |
| 4,555,239 | A | * | 11/1985 | Miranti, Jr. | F16H 57/05 474/93 |
| 4,618,334 | A | * | 10/1986 | Miranti, Jr. | F16H 57/05 474/93 |
| 4,622,023 | A | * | 11/1986 | Quick | F16H 57/0415 474/93 |
| 4,629,444 | A | * | 12/1986 | Miranti, Jr. | F16H 57/05 474/93 |
| 5,735,669 | A | * | 4/1998 | Niemela | F04D 29/281 416/183 |
| 6,938,508 | B1 | * | 9/2005 | Saagge | F16H 57/0489 474/93 |
| 7,798,930 | B2 | * | 9/2010 | Nojiri | F16H 55/56 123/48 B |
| 8,398,512 | B2 | * | 3/2013 | Dickinger | F16H 55/38 474/93 |
| 8,776,930 | B2 | * | 7/2014 | Tadych | F16H 57/0489 474/93 |
| 8,834,307 | B2 | * | 9/2014 | Itoo | F16H 57/0416 474/93 |
| 8,911,312 | B2 | * | 12/2014 | Itoo | F16H 57/0489 474/93 |
| 9,222,572 | B2 | * | 12/2015 | Yamaguchi | F16H 57/0489 474/93 |
| 9,719,591 | B2 | * | 8/2017 | Wade | F04D 27/004 |
| 2006/0270503 | A1 | * | 11/2006 | Suzuki | F16H 57/0415 474/93 |
| 2009/0298627 | A1 | * | 12/2009 | Johnson | F16H 9/18 474/93 |
| 2013/0090198 | A1 | * | 4/2013 | Itoo | F16H 57/03 474/93 |
| 2013/0090199 | A1 | * | 4/2013 | Itoo | F16H 57/0416 474/93 |
| 2014/0287857 | A1 | * | 9/2014 | Doering | F02M 35/1017 474/93 |
| 2021/0164556 | A1 | * | 6/2021 | Peterson | F16F 15/1435 |

\* cited by examiner

PULLEY ARRANGEMENT FOR A BELT DRIVE AND AGRICULTURAL MACHINE WITH SUCH

CROSS-REFERENCE TO RELATED APPLICATIONS

This application claims priority to European Patent Application No. 23185394.6, filed on Jul. 13, 2023, which is hereby incorporated by reference.

FIELD OF THE DISCLOSURE

The disclosure relates to a pulley arrangement.
The disclosure further relates to the pulley arrangement for a belt drive of an agricultural machine.

BACKGROUND

Agricultural machines, such as combine harvesters and balers are well known and are used for travel through fields for agricultural processes such as harvesting, collecting and bundling the crops etc.

SUMMARY

During and/or after the agricultural processes, debris and dust may be produced. Debris such as chaff, stalks, cobs, etc. are for example the result of the chopping process within a harvesting machine. Other debris may be due to spreading of existing debris lying on the field during the travel of agricultural machines in the field. This debris and dust may accumulate on the components of the machine such as drives, gearboxes, pulleys etc. during its travel. The agricultural machines may be stopped due to the debris, resulting in undesirable downtime. The accumulation of the debris around a pulley arrangement for a belt drive and its components may lead to friction between pulley, its components and/or housing of the pulley. Further, it impacts the lubrication connections to the pulley arrangements.

An arrangement to reduce or to avoid such debris accumulation on the pulley arrangement may be provided.

The disclosure relates to a pulley arrangement including an input shaft, a pulley and at least one ring disc. The input shaft includes a first end and a second end. The first end of the input shaft is couplable to a gear box. The pulley, having an inner pulley surface and an outer pulley surface, is mounted coaxially on the input shaft.

The object will be achieved by the teaching of one or more implementations disclosed herein.

Accordingly, a pulley arrangement of above-mentioned type will be provided. The pulley arrangement further includes the at least one ring disc fastened coaxially to the inner pulley surface or the outer pulley surface. A plurality of air flow directing protrusions, grooves, or protrusions and grooves extend from an inner diameter to an outer diameter of the ring disc. A circumferential ring disc gap is provided between the at least one ring disc and the input shaft. Alternatively, the ring disc may fasten coaxially to the inner pulley surface or the outer pulley surface with the help of bolts, screws, rivets or any such similar fasteners or couplers. Alternatively, the ring disc and the pulley may be welded, casted or forged together.

Further, the at least one ring disc may include one ring disc fastened coaxially to the inner pulley surface and a circumferential pulley gap is provided between the pulley and the input shaft. The mentioned pulley gap may provide an air flow channel from the outer pulley surface towards the inner pulley surface to guide air to the ring disc fastened on the inner pulley surface.

The at least one ring disc may include a first ring disc fastened coaxially to the outer pulley surface and a second ring disc fastened coaxially to the inner pulley surface and a circumferential pulley gap is provided between the pulley and the input shaft. Due to this alternative, the pulley is provided with a ring disc fastened on each of its sides. Providing a ring disc on both sides of the pulley will provide air flow to an area surrounding both pulley surfaces. The first ring disc, second ring disc and the pulley may be welded, casted or forged together.

The ring discs may be disposed such that the plurality of air flow directing means of the respective ring disc is facing the respective pulley surface. Alternatively, the plurality of air flow directing means of ring discs may be available on both faces of the ring discs.

A plurality of fastening apertures may be located circumferentially between the inner and the outer diameter of the ring disc. The fastening apertures may be for example holes of any suitable shapes such as for the above-mentioned bolts, screws, rivets or any such similar fasteners or couplers.

The plurality of air flow directing protrusions, grooves, or both protrusions and grooves may extend in a curved shape towards an opposite direction of the rotation of the pulley. Alternatively, or in addition, the air flow directing protrusions, grooves, or both protrusions and grooves may extend in radially linear shape towards the opposite direction of the rotation of the pulley. In addition, in order to create an air suction or air push in an axial direction of the pulley, the shape of the air flow directing protrusions, grooves, or both protrusions and grooves may comprise a twisted shape such as propeller blades or ventilator blades or such similar profiles.

The plurality of air flow directing protrusions, grooves, or both protrusions and grooves may extend in a curved shape towards a direction of the rotation of the pulley. Alternatively, or in addition, the air flow directing protrusions, grooves, or both protrusions and grooves may extend in radially linear shape towards the direction of the rotation of the pulley. In addition, in order to create an air suction or air push in an axial direction of the pulley, the shape of the air flow directing protrusions, grooves, or both protrusions and grooves may comprise a twisted shape such as propeller blades or ventilator blades or such similar profiles.

The air flow directing protrusions, grooves, or both protrusions and grooves are formed on a surface between the inner and the outer diameter of the at least one ring disc. The protrusions may also include fins or wings or blades. The air flow directing protrusions, grooves, or both protrusions and grooves may be welded or printed on the ring disc or the ring disc may be casted or forged together with the air flow directing means.

Further, in one implementation a belt drive might be provided including a pulley arrangement as proposed above.

Furthermore, an agricultural machine may include a belt drive as mentioned above. For example, the agricultural machine may be a combine harvester, a forage harvester or a baler.

The above and other features will become apparent from the following detailed description and accompanying drawings.

DETAILED DESCRIPTION

The implementations disclosed in the above drawings and the following detailed description are not intended to be exhaustive or to limit the present disclosure to these implementations.

Figure 1:
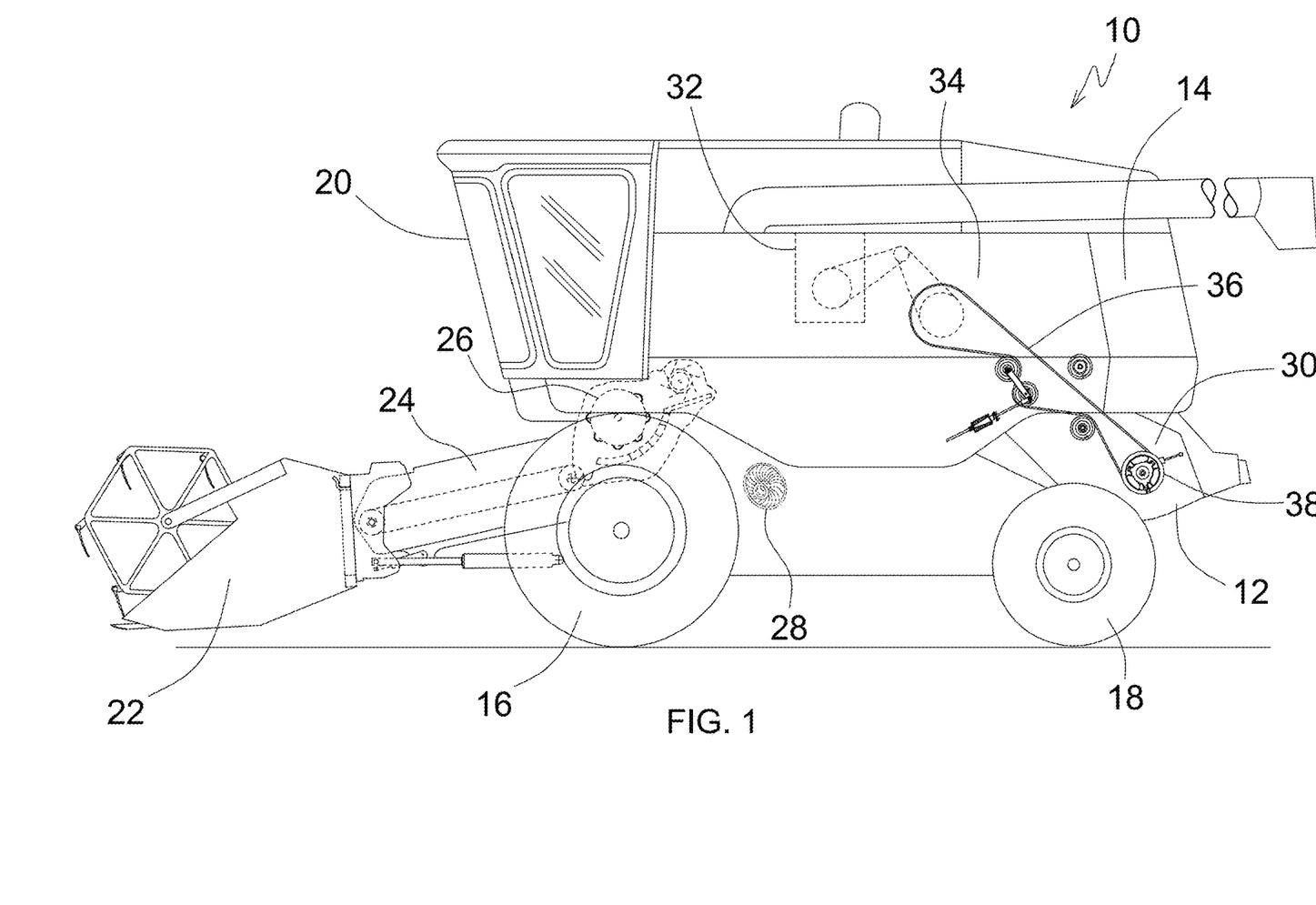
FIG. 1 shows a schematic view of an agricultural machine in a form of a combine harvester having a belt drive.
Figure 2:
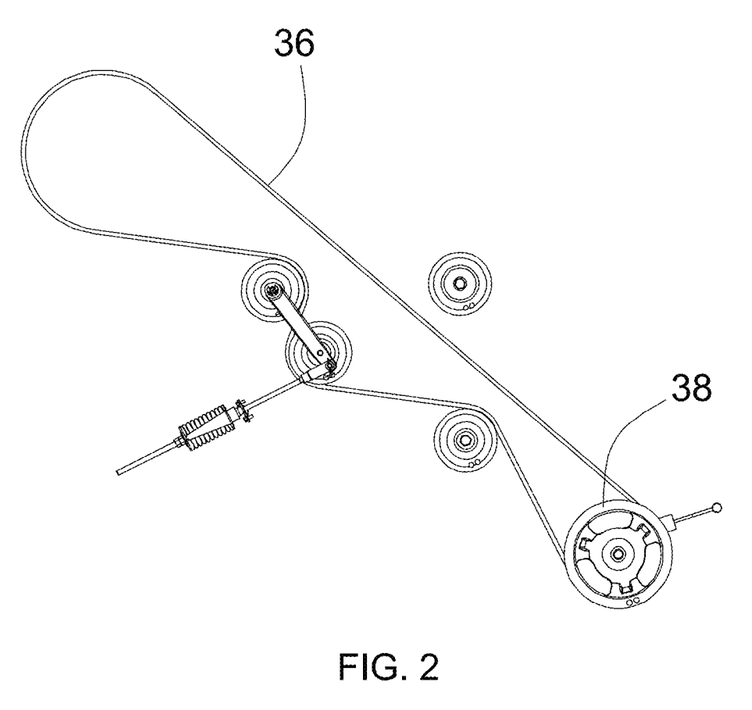
FIG. 2 shows a schematic view of the belt drive according to FIG. 1.

Referring now to FIG. 1 and FIG. 2, an agricultural machine in form of a combine harvester 10 is shown as an example. The agricultural machine may be also a forage harvester or a baler. The combine harvester 10 includes a main frame 12 that provides a structure for mounting combine body 14 and supported above the ground on forward drive wheels 16 and rear wheels 18. Alternatively, the combine harvester 10 may be fully or partially supported on ground-engaging crawler tracks. Further, the combine harvester 10 includes an operator station 20 which houses a seat for an operator and several controls which may be manipulated by the operator in order to control operations of the combine harvester 10. In operation, a forward mounted header 22 cut a crop material from a field and converges it to a feeder house 24 for transferring it to process further inside the combine body 14.

Further, the cut crop material is threshed, separated, cleaned and disposed by a threshing and separating unit 26, a cleaning system 28 and residue disposal system 30 respectively. The threshing and separating unit 26, the cleaning system 28 and the residue disposal system 30 are suitably housed within the combine body 14. The mentioned various operations require power, which is provided by an engine 32 mounted on the main frame 12 and housed within the combine body 14. Alternatively, an electric drive may act as a prime mover and also fulfil the power requirement for various operations. Additionally, the electric drive may be an auxiliary drive to assist the engine 32.

A power transfer means 34 transfers power from engine to various components of the combine harvester 10 to perform these operations. As shown in FIG. 1, the power transfer means 34 comprise a belt drive 36 which includes a pulley arrangement 38. For example, in one such operation, power from engine 32 is provided to the residue disposal system 30 as shown in FIG. 1.

Figure 3:
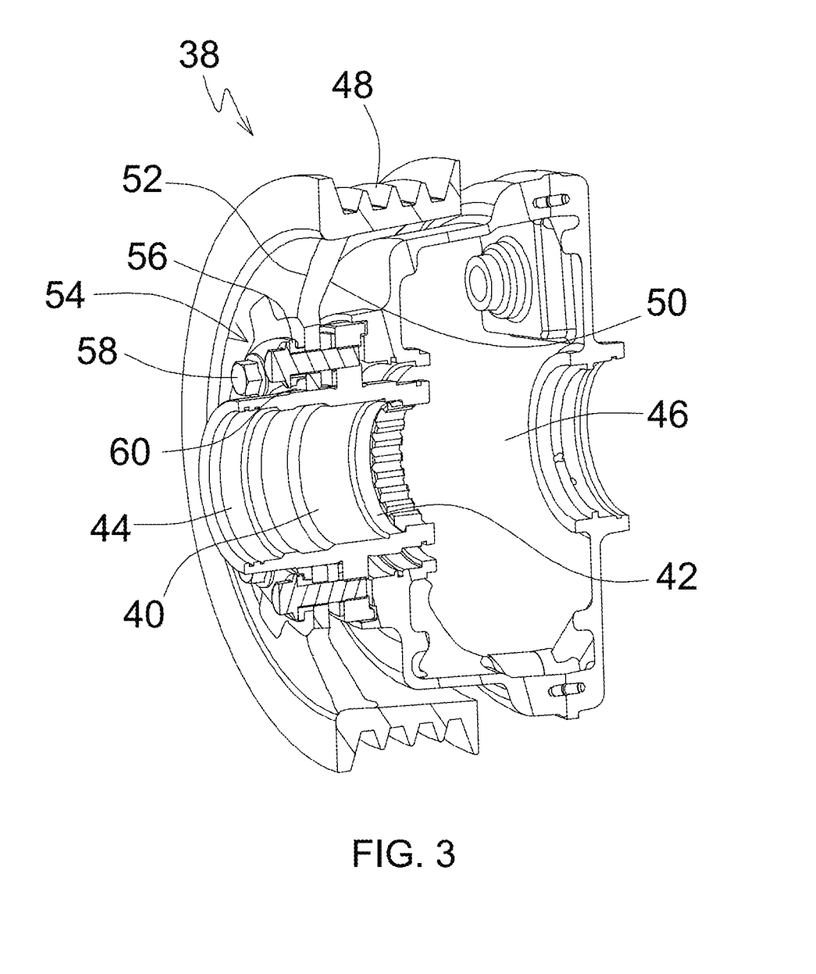
FIG. 3 shows a cross sectional view of one example for a pulley arrangement of the belt drive according to FIG. 2.

Referring now to FIG. 3, there is shown the pulley arrangement 38 for the belt drive 36. The pulley arrangement 38 includes an input shaft 40. The input shaft 40 is having first end 42 and second end 44. The first end 42 of the input shaft 40 is configured to be couplable to a gear box 46. Further, the pulley arrangement 38 comprises a pulley 48.

The pulley 48 has an inner pulley surface 50 and an outer pulley surface 52. The pulley 48 is mounted coaxially on the input shaft 40. The pulley 48 may be manufactured with extensive variety of materials such as aluminum, brass, cast iron, plastic, stainless steel, steel, and zinc alloy etc. to ensure greater stability. Further, the pulley arrangement 38 includes a protection device 54 in form of a ring disc 56. The ring disc 56 is fastened coaxially to the outer pulley surface 52. The ring disc 56 is fastened coaxially to the outer pulley surface 52 with the help of screws 58. Further, a circumferential ring disc gap 60 is provided between the at least one ring disc 56 and the input shaft 40.

Figure 4:
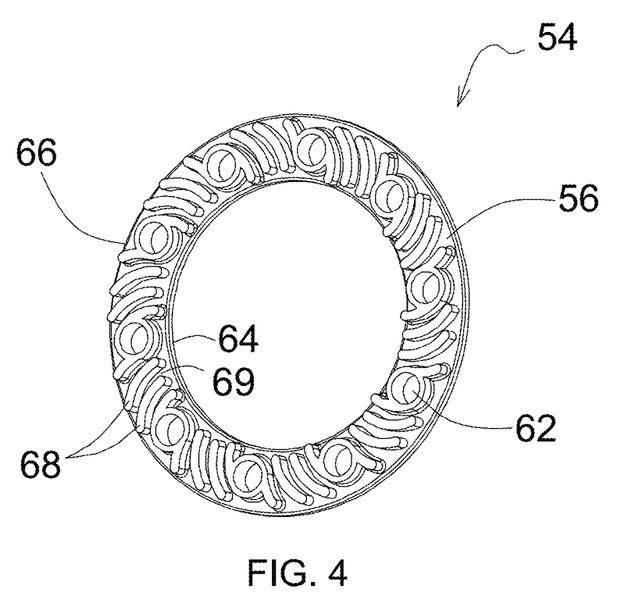
FIG. 4 shows a schematic view of a protection device of the pulley arrangement according to FIG. 3.

As shown in FIG. 4, a plurality of fastening apertures 62 are located circumferentially between the inner diameter 64 and the outer diameter 66 of the ring disc 56. The fastening apertures 62 may be holes for receiving the above-mentioned screws 58, or any other suitable type of aperture for another suitable type of fastener. Furthermore, a plurality of air flow directing means 68 extends from the inner diameter 64 to the outer diameter 66 of the ring disc 56. The plurality of air flow directing means 68 extends in a curved shape from the inner diameter 64 to the outer diameter 66 of the ring disc 56. The direction of the curves of the flow directing means 68 can be both towards or against the direction of rotation of the pulley 48. In both cases, circulation of air, respectively an air curtain is created when the ring disc 56 is rotating, as described in more detail below. With that an accumulation of debris or dust is restrained from plugging on the pulley surfaces 50, 52.

Further, the air flow directing means 68 are protrusions formed on a surface between the inner diameter 64 and the outer diameter 66 of the ring disc 56. Alternatively, the air flow directing means 68 may be grooves formed on the surface between the inner diameter 64 and the outer diameter 66 of the ring disc 56. In some implementations, both protrusions and grooves may be employed. As one example, as illustrated in FIG. 4, the air flow directing means 68 may be protrusions 68 that define grooves 69 therebetween.

In operation, the belt drive 36 drives the pulley 48 which in turn rotate the ring disc 56 fastened to the pulley 48. This creates a pressure difference to draw air axially inwards through the circumferential ring disc gap 60 and pushes it radially outwards through the air flow directing means 68 to generate a curtain of air at the outer pulley surface 52. The curtain of air restrains accumulation or entry of debris into the pulley 48 or into components of the agricultural machine 10.

Figure 5:
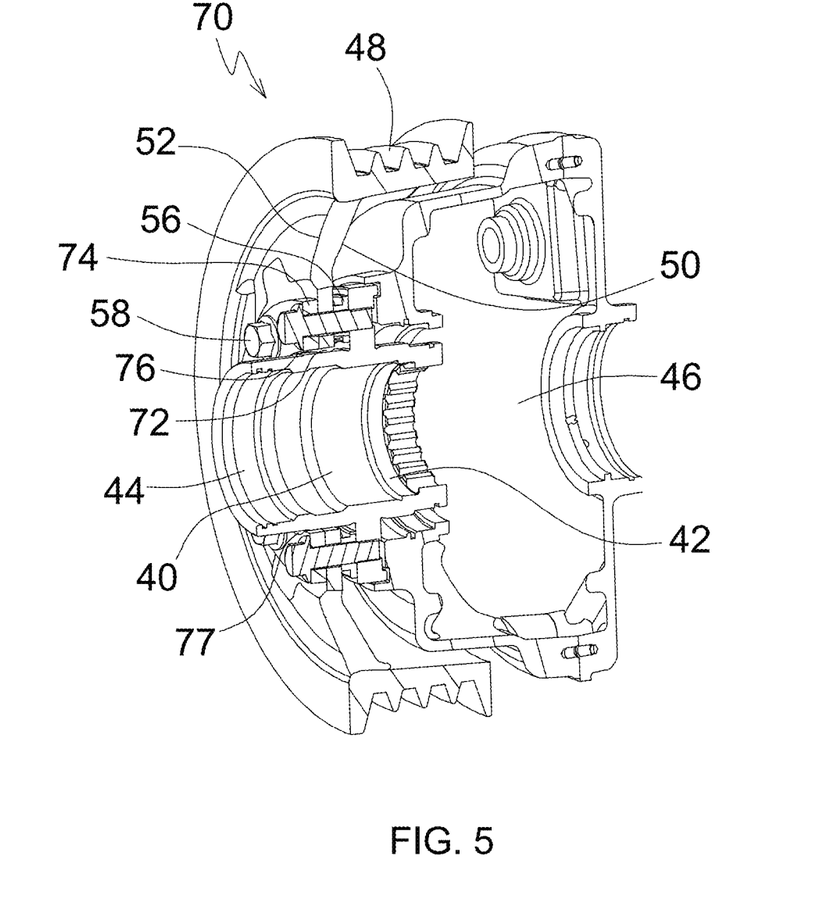
FIG. 5 shows a cross sectional view of another example for a pulley arrangement of the belt drive according to FIG. 2.
Figure 6:
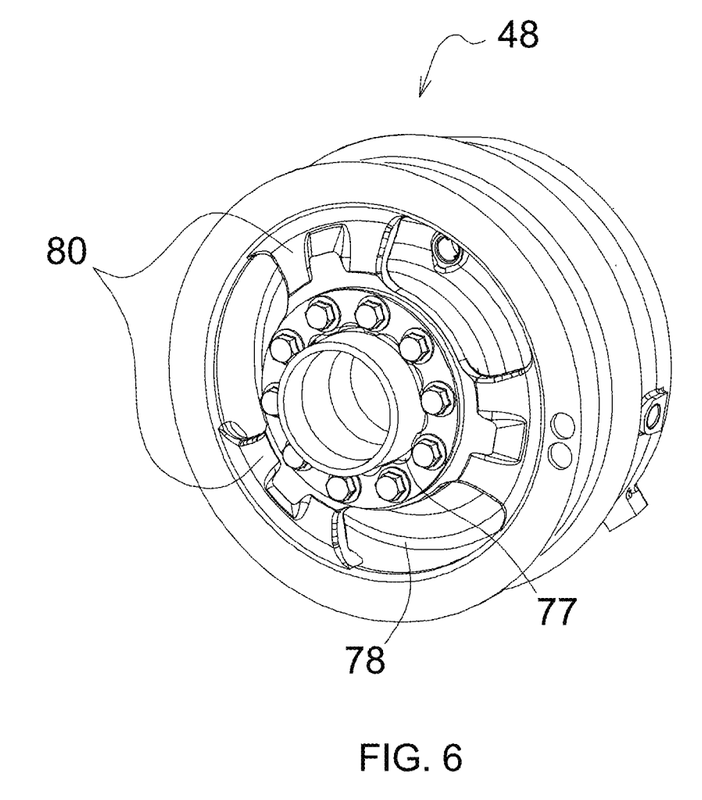
FIG. 6 shows a schematic perspective view of the pulley arrangement according to FIG. 3.

Further, FIG. 5 shows an implementation having a pulley arrangement 70. In the pulley arrangement 70, the ring disc 56 is fastened coaxially to the inner pulley surface 50. Further, one or more of a circumferential pulley gap 72 is provided between the pulley 48 and the input shaft 40. For a proper pulley arrangement 70, a shim 74 is fastened at the outer pulley surface 52. The shim 74 is designed to provide one or more shim gaps 76 between the shim 74 and the input shaft 40. The one or more shim gaps 76 can be for example a circumferential gap 76 between inner diameter of the shim 74 and outer diameter of the input shaft 40. Alternatively or additionally, the shim gaps 76 can be provided by recesses or cut outs 77 (as indicated in FIG. 5 and FIG. 6 as an additional example) along the thickness of an inner circumferential edge of the shim 74 in addition or instead of the circumferential gap 76. As provided for the shim 74, similar recesses or cut outs (not shown) along the thickness of an inner circumferential edge of the pulley 48 can be provided instead or in addition to the circumferential pulley gap 72. The similar recesses or cut-outs are aligned to the recesses or cut outs 77 of the shim 74. This shim gap 76 along with the circumferential pulley gap 72, respectively the alternative recesses or cut outs on the shim 74 and the pulley 48, create an axial channel for air to be drawn inwards (towards the inner pulley surface 50) in case of suction and air is pushed radially outwards through the air flow directing means 68 to generate the curtain of air. This curtain of air is generated at outer pulley surface 52 as the radially pushed air flows from the inner pulley surface 50 to the outer pulley surface 52 through openings 78 provided between spokes 80 of the pulley 48 as shown in FIG. 6. The curtain of air as described restrains accumulation or entry of debris from outer pulley surface 52 into the pulley 48 or into components of the agricultural machine 10. Additionally, a portion of the air curtain is formed at the inner pulley surface 50 too which restrains accumulation or entry of debris into the pulley 48 or into components of the agricultural machine 10 at inner side of the pulley 48.

Figure 7:
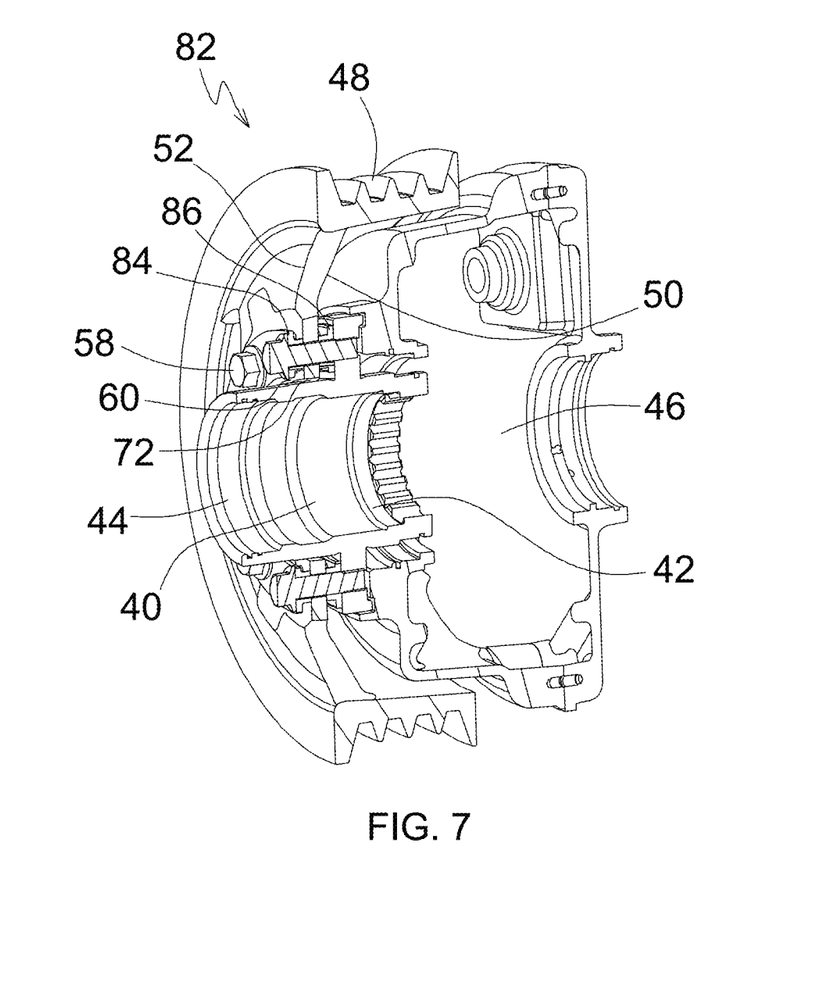
FIG. 7 shows a cross sectional view of yet another example for a pulley arrangement of the belt drive according to FIG. 2.

Further FIG. 7 shows an implementation having a pulley arrangement 82. In the pulley arrangement 82, a first ring disc 84 fastened coaxially to the outer pulley surface 52 and a second ring disc 86 fastened coaxially to the inner pulley surface 50. In this arrangement 82, the circumferential pulley gap 72 is provided between the pulley 48 and the input shaft 40. As already described above, also in this implementation in addition to or instead of the pulley gap 72, the recesses or cut outs can be provided. In this implementation as shown in FIG. 7, the first ring disc 84 is designed in a way to provide the circumferential ring disc gap 60 between the first ring disc 84 and the input shaft 40. As already described above for the shim 74, also in this implementation in addition to or instead of the circumferential ring gap 60, the recesses or cut outs can be provided. The circumferential ring disc gap 60 along with the circumferential pulley gap 72, respectively the alternative recesses or cut outs on the first ring disc 84 and on the pulley 48, create an axial channel for air to be drawn inwards (towards the inner pulley surface 50) due to suction and air is pushed radially outwards through the air flow directing means 68 to generate the curtain of air. The ring discs 84, 86 are disposed such that the plurality of air flow directing means 68 of the respective ring disc 84, 86 is facing the respective pulley surface 50, 52. In this implementation, the effects of creating air flow, respectively providing a curtain of air, having the ring disc on the outer pulley surface and on the inner pulley surface are combined.

The terminology used herein is for the purpose of describing example implementations and is not intended to be limiting of the disclosure. As used herein, the singular forms "a," "an," and "the" are intended to include the plural forms as well, unless the context clearly indicates otherwise. It will be further understood that any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A pulley arrangement for a belt drive comprising:
   an input shaft having a first end and a second end, the first end of the input shaft being configured to be couplable to a gear box;
   a pulley mounted coaxially on the input shaft, the pulley including an opening, the input shaft extending through the opening;
   an inner pulley surface;
   an outer pulley surface, the opening extending from the inner pulley surface to the outer pulley surface; and
   at least one ring disc fastened coaxially to the inner pulley surface or the outer pulley surface, the at least one ring disc defining a plurality of air flow directing protrusions, grooves, or both protrusions and grooves, each extending from an inner diameter towards an outer diameter of the ring disc, and wherein a circumferential ring disc gap is provided between the at least one ring disc and the input shaft, and
   wherein the plurality of air flow directing protrusions, grooves, or both protrusions and grooves is disposed proximate to the opening.

2. The pulley arrangement for a belt drive of claim 1, wherein the at least one ring disc includes one ring disc fastened coaxially to the inner pulley surface and a circumferential pulley gap is provided between the pulley and the input shaft.

3. The pulley arrangement for a belt drive of claim 1, wherein the at least one ring disc includes a first ring disc fastened coaxially to the outer pulley surface and a second ring disc fastened coaxially to the inner pulley surface, and a circumferential pulley gap is provided between the pulley and the input shaft.

4. The pulley arrangement for a belt drive of claim 3, wherein the first and second ring discs are disposed such that the plurality of air flow directing protrusions, grooves, or both protrusions and grooves of the respective ring disc is facing the respective pulley surface.

5. The pulley arrangement for a belt drive of claim 1, further comprising a plurality of fastening apertures disposed circumferentially between the inner and the outer diameter of the ring disc.

6. The pulley arrangement for a belt drive of claim 1, wherein the plurality of air flow directing protrusions, grooves, or both protrusions and grooves each extend in a curved shape towards an opposite direction of the rotation of the pulley.

7. The pulley arrangement for a belt drive of claim 1, wherein the plurality of air flow directing protrusions, grooves, or both protrusions and grooves each extend in a curved shape towards a direction of rotation of the pulley.

8. The pulley arrangement for a belt drive of claim 1, wherein the plurality of air flow directing protrusions, grooves, or both protrusions and grooves are formed on a surface between the inner and the outer diameter of the at least one ring disc.

9. A belt drive for an agricultural machine, the belt drive comprising:
 a pulley arrangement including
  an input shaft having a first end and a second end, the first end of the input shaft configured to be couplable to a gear box,
  a pulley mounted coaxially on the input shaft, the pulley including an opening, the input shaft extending through the opening,
  an inner pulley surface,
  an outer pulley surface, the opening extending from the inner pulley surface to the outer pulley surface, and
  at least one ring disc fastened coaxially to the inner pulley surface or the outer pulley surface, the at least one ring disc defining a plurality of air flow directing protrusions, grooves, or both protrusions and grooves, each extending from an inner diameter towards an outer diameter of the ring disc, and wherein a circumferential ring disc gap is provided between the at least one ring disc and the input shaft, and
 wherein the plurality of air flow directing protrusions, grooves, or both protrusions and grooves is disposed proximate to the opening.

10. The belt drive of claim 9, wherein the at least one ring disc includes one ring disc fastened coaxially to the inner pulley surface and a circumferential pulley gap is provided between the pulley and the input shaft.

11. The belt drive of claim 9, wherein the at least one ring disc includes a first ring disc fastened coaxially to the outer pulley surface and a second ring disc fastened coaxially to the inner pulley surface, and a circumferential pulley gap is provided between the pulley and the input shaft.

12. The belt drive of claim 11, wherein the first and second ring discs are disposed such that the plurality of air flow directing protrusions, grooves, or both protrusions and grooves of the respective ring disc is facing the respective pulley surface.

13. An agricultural machine, comprising:
 a belt drive including a pulley arrangement, the pulley arrangement including
  an input shaft having a first end and a second end, the first end of the input shaft configured to be couplable to a gear box,
  a pulley mounted coaxially on the input shaft, the pulley including an opening, the input shaft extending through the opening,
  an inner pulley surface,
  an outer pulley surface, the opening extending from the inner pulley surface to the outer pulley surface, and
  at least one ring disc fastened coaxially to the inner pulley surface or the outer pulley surface, the at least one ring disc defining a plurality of air flow directing protrusions, grooves, or both protrusions and grooves, each extending from an inner diameter towards an outer diameter of the ring disc, and wherein a circumferential ring disc gap is provided between the at least one ring disc and the input shaft, and
 wherein the plurality of air flow directing protrusions, grooves, or both protrusions and grooves is disposed proximate to the opening.

14. The agricultural machine of claim 13, wherein the at least one ring disc includes one ring disc fastened coaxially to the inner pulley surface and a circumferential pulley gap is provided between the pulley and the input shaft.

15. The agricultural machine of claim 13, wherein the at least one ring disc includes a first ring disc fastened coaxially to the outer pulley surface and a second ring disc fastened coaxially to the inner pulley surface, and a circumferential pulley gap is provided between the pulley and the input shaft.

16. The agricultural machine of claim 15, wherein the first and second ring discs are disposed such that the plurality of air flow directing protrusions, grooves, or both protrusions and grooves of the respective ring disc is facing the respective pulley surface.

17. The agricultural machine of claim 13, further comprising a plurality of fastening apertures disposed circumferentially between the inner and the outer diameter of the ring disc.

18. The agricultural machine of claim 13, wherein the plurality of air flow directing protrusions, grooves, or both protrusions and grooves each extend in a curved shape towards an opposite direction of the rotation of the pulley.

19. The agricultural machine of claim 13, wherein the plurality of air flow directing protrusions, grooves, or both protrusions and grooves each extend in a curved shape towards a direction of rotation of the pulley.

20. The agricultural machine of claim 13, wherein the plurality of air flow directing protrusions, grooves, or both protrusions and grooves are formed on a surface between the inner and the outer diameter of the at least one ring disc.

* * * * *